R. H. KJELLMAN.
AUTOMATIC FIREARM.
APPLICATION FILED OCT. 9, 1908.

1,040,692.

Patented Oct. 8, 1912.
5 SHEETS—SHEET 1.

Witnesses:
J. A. Rennie
A. F. Connett

Inventor:
Rudolf H. Kjellman
By
his Attorney

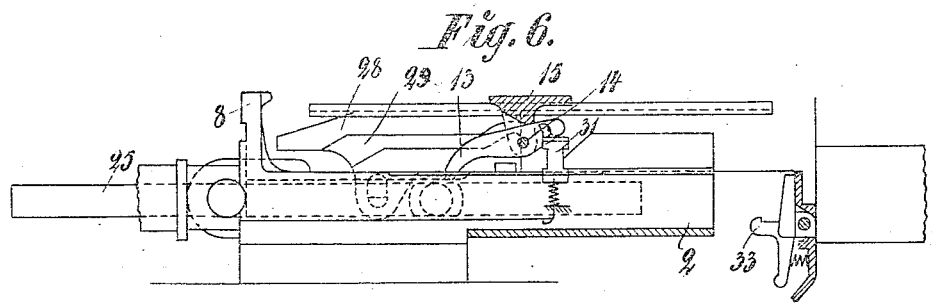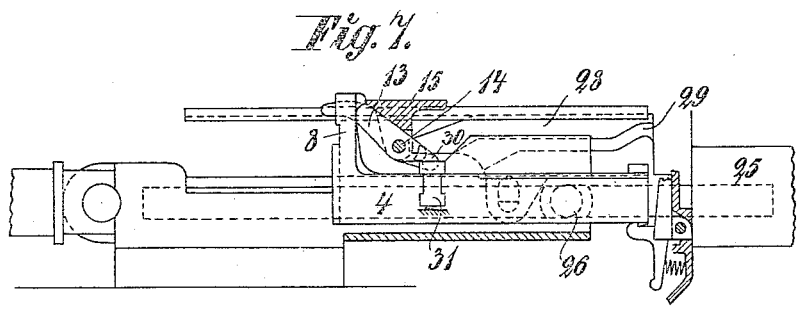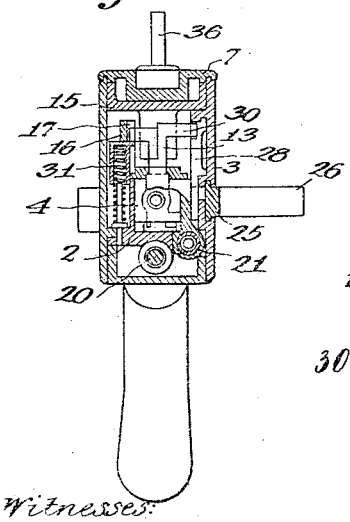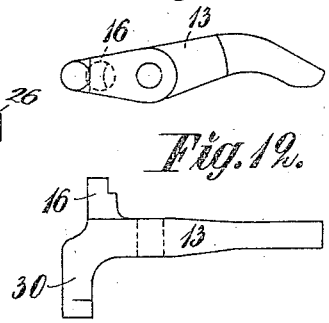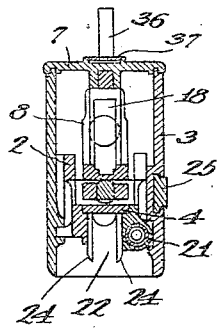

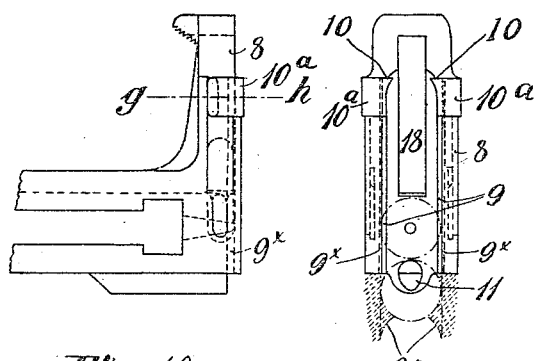
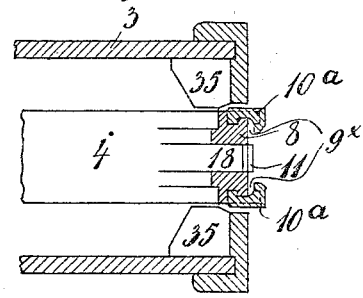

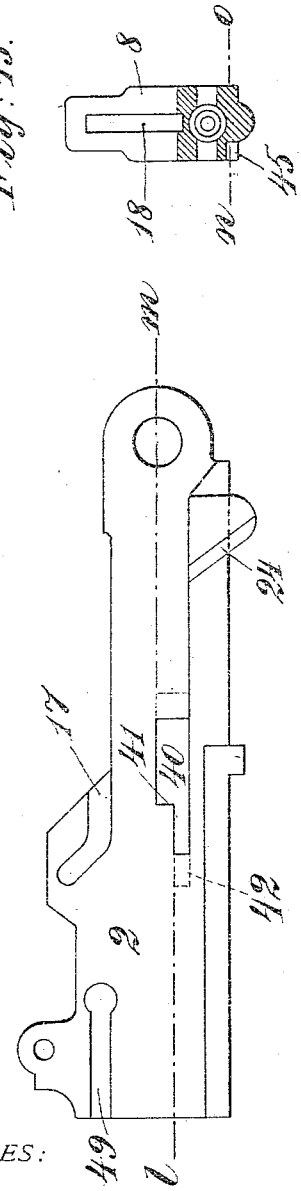
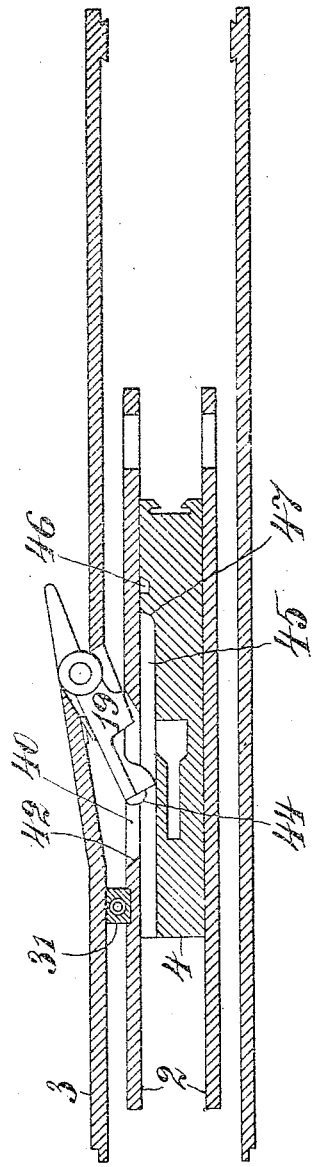

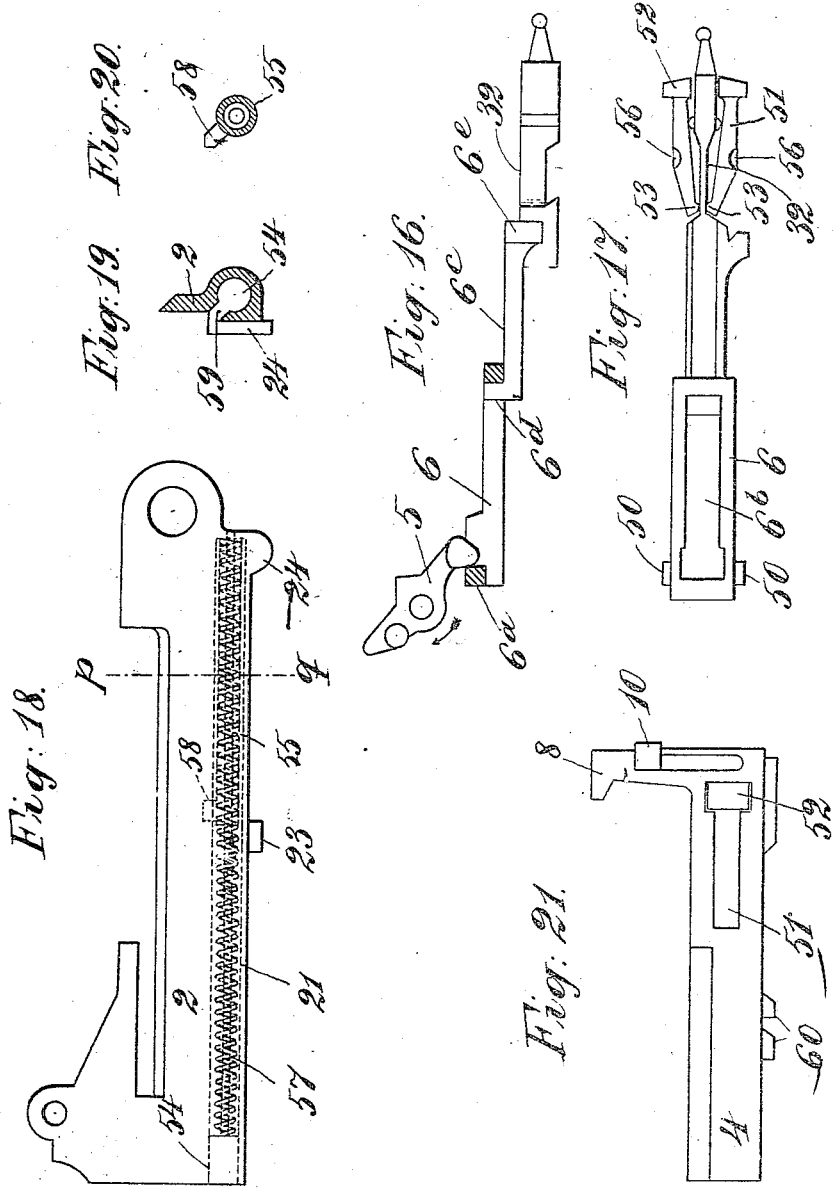

UNITED STATES PATENT OFFICE.

RUDOLF HENRIK KJELLMÁN, OF STOCKHOLM, SWEDEN, ASSIGNOR TO NYA AKTIE-BOLAGET STOCKHOLMS VAPENFABRIK, OF STOCKHOLM, SWEDEN.

AUTOMATIC FIREARM.

1,040,692. Specification of Letters Patent. Patented Oct. 8, 1912.

Application filed October 9, 1908. Serial No. 456,866.

*To all whom it may concern:*

Be it known that I, RUDOLF HENRIK KJELLMAN, a subject of the King of Sweden, and resident of Handtverkaregatan, Stockholm, Sweden, have invented certain Improvements in Automatic Firearms, of which the following is a specification.

This invention relates to certain improvements in fire-arms and more especially in that class of such devices which are known as automatic, and the object of the invention is to provide a device of this general character of a simple and comparatively inexpensive nature having certain features of novelty and improvement whereby a rapid and reliable feeding of the cartridges from the cartridge band and the like into the barrel and the ejecting of the empty shell is afforded.

The invention consists in certain novel features of the construction, and combinations and arrangements of the several parts of the improved automatic fire-arms, whereby certain important advantages are attained, and the device is rendered simpler, less expensive and otherwise better adapted and more convenient for use, all as will be hereinafter fully set forth.

The novel features of the invention will be carefully defined in the claims.

In order that my improvements may be the better understood, I will now proceed to describe the same with reference to the accompanying drawings, wherein—

Figure 1:
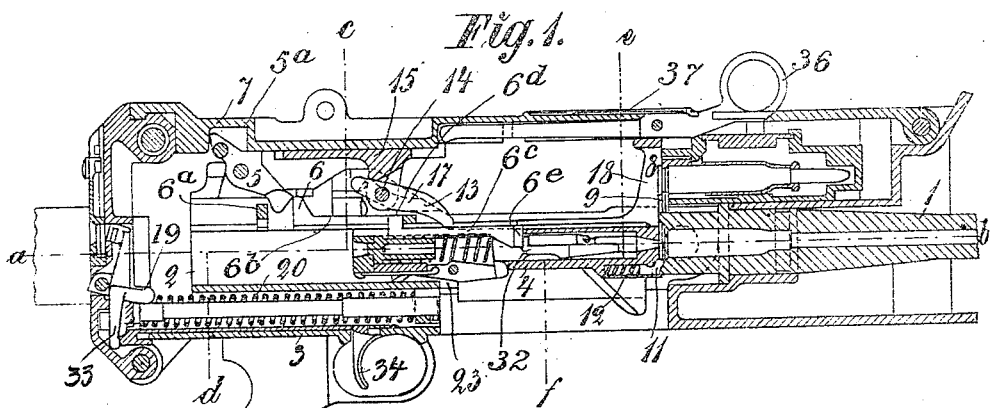
Figure 2:
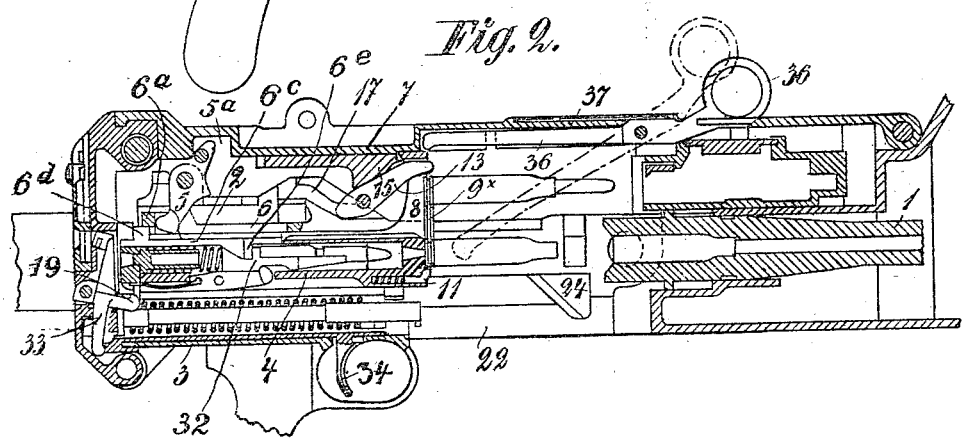
Figure 3:
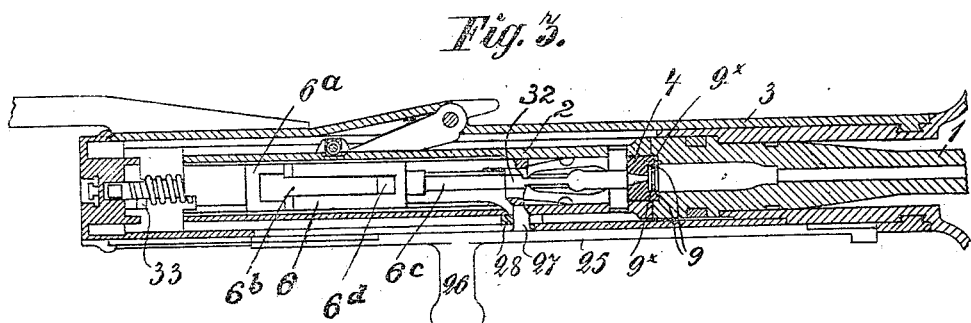

Figure 1 is a longitudinal sectional view of a machine-gun arranged in accordance with my invention, the parts being shown in the position they occupy at the moment of discharge; Fig. 2 is a view similar to Fig. 1 with the parts shown in the position they occupy when the barrel and the breech block have been moved to their rear positions, by the recoil; Fig. 3 is a sectional view taken on the line $a$—$b$ of Fig. 1; Fig. 4 is a sectional view taken on the line $c$—$d$ of Fig. 1; Fig. 5 is a sectional view taken on the line $e$—$f$ of Fig. 1; Figs. 6 and 7 show several parts viewed from the opposite side with relation to that in Figs. 1 and 2; Fig. 8 is a view in side elevation on a large scale of the transporter disclosed in the present invention; Fig. 9 is a front view of the structure shown in Fig. 8; Fig. 10 is a sectional view taken on the line $g$—$h$ of Fig. 8; Fig. 11 is a detached view on an enlarged scale of a lever shown in the present invention for imparting a certain movement to the cartridge; Fig. 12 is a top plan view of the elements shown in Fig. 11; Fig. 13 is a detached view in side elevation of the tail piece as contained in the present embodiment of my invention; Fig. 14 is a sectional view taken through the casing and tail piece illustrating certain features of the invention the section through the tail piece being on the line $l$—$m$ of Fig. 13 and through the breech-block on the line $n$—$o$ of Fig. 15; Fig. 15 is a view in cross section of the breech block; Fig. 16 is a longitudinal sectional view illustrating details relative to the firing pin; Fig. 17 is a top plan view of the structure shown in Fig. 16 with the operating lever omitted and disclosing the locking means coöperative therewith; Fig. 18 is a detail view of the tail piece showing the spring of the breech block; Fig. 19 is a sectional view taken on the line $p$—$q$ of Fig. 18; Fig. 20 is a section through the tube containing the spring of the breech block; and Fig. 21 illustrates the breech block in detail.

In these views, 1 denotes the barrel and 2 the tail piece firmly connected with the barrel and reciprocating, in the ordinary way, in the casing 3 of the mechanism. The breech block 4 partakes of such reciprocatory movement and is also moved forward and backward with relation to the tail piece. This latter movement is effected in the ordinary manner by means of the lever 5 pivoted on the tail piece and having its upper extremity engaged in a recess $5^a$ in the casing whereby pivotal movement is imparted to said lever during reciprocating movement of the tail piece.

The lever has its lower end engaged with a shoulder $6^a$ on a link 6 mounted for sliding movement parallel with and above the breech block. The link 6 is slotted endwise as is shown particularly in Figs. 3 and 17 and below said link is arranged an endwise movable slide member $6^c$ having at its rear end an upstanding projection $6^d$ adapted, during movement of said slide member to traverse the endwise slot $6^b$ of the link 6. The slide member $6^c$ has a pendent lug $6^e$ at its forward end which communicates the movement of said member to the firing pin 32 to move the same relatively to the breech block and permit movement of the breech block relative to the tail piece. The link 6 is guided by slots 49 on the tail piece into which enter the lateral pins 50 on the link 6. The movement of the lever 5 in the direction of the arrow in Fig. 16 causes the firing pin to be drawn backward in the breech block which consists as usual of a hollow body in which the firing pin is placed as shown in Fig. 1.

The breech block is provided at its front or forward end with a transporter 8 for extracting the cartridge from the band and guiding the same during its following downward movement which transporter consists of an arm extending upward and having in its front or forward side a slot 9 adapted to receive the end of a cartridge and provided in both its sides with grooves 9ˣ adapted to inclose the flange of the cartridge as is particularly shown in Figs. 8, 9 and 10 of the drawings. The top end of the slot 9 is formed by two extracting hooks 10, 10 which are fixed to the sets of the transporter by means of flexible arms 10ᵃ or the like so that they can yield toward and from each other. The said extracting hooks 10, 10 are located on a level with the cartridge located in the band and are adapted to engage the same. In the central vertical plane of the slot 9 a projecting part 11 is provided which is disposed in a longitudinal channel in the breech block, a spring 12 (Fig. 1) being mounted behind the said part 11 so that it can yield longitudinally.

The cartridge, withdrawn from the band, can be moved transversely downward, guided by the transporter and be placed opposite the barrel while the position of the cartridge parallel to the barrel is maintained. The said downward movement of the cartridge is effected by a lever 13. This lever 13 is located above the breech block behind the transporter and is pivotally connected at 14 to a special part 15 which is located under the cover 7 and is fixed to the casing 3 so as to be detachable. The lever 13 is provided at its rear end with a lateral projection 16 extending into the inclined groove 17 in a side of the tail piece. An opening 18 for the front end of the lever is provided in the transporter into which opening the lever can be moved and placed above the rear end of the cartridge.

As shown in Fig. 1 wherein the position of the parts is illustrated at the moment of discharge but before the recoil, the transporter has been advanced so far through the previous forward movement of the breech block 4 that the cartridge, held by the band, has penetrated, between the extractors 10, 10 and has been embraced by the same at the flange, the tail piece and the breech block move backward simultaneously during the recoil and the engaged cartridge is thus pulled backward. At a certain moment after the releasing operation the breech block moves backward with relation to the tail piece. The backward movement of the latter is stopped immediately thereafter and the tail piece is held in its rear position by the locking dog 19 (Figs. 3, 13 and 14). The breech block, on the other hand, will continue downward. Owing to this fact the cartridge is fully withdrawn from the band.

During the backward movement of the tail piece the position of the lever 13 is changed from the position shown in Fig. 1 to that shown in Fig. 2 owing to the engagement of the projection or lug 16 with the slot 17 so that the forward end of the lever has been swung upward and during the rearward movement of the breech block the lever end when swung upward passes into the opening 18 and is placed above the rear end of the cartridge. When the breech block has arrived at its rear terminal position, it is locked by the dog 19 which is pivoted to the casing 3, the said dog being moved by the said locking operation so that the tail piece is released. The tail-piece is now forced forward by the spring 20 while the breech block remains in its position. The fore end of the lever 13 is thereby swung downward to the position shown in Fig. 1, the cartridge being thus moved to its lower position opposite the barrel by the lever and is stopped by the part 11.

The arrangement of the breech block as contained in the present embodiment of my invention is shown in Figs. 18 to 21. In the barrel extension 2 there is bored a hole 54 into which the tube 55, the spring 21 and the pin 57 are inserted on which pin the tube can slide. The tube 55 is provided with an arm 58 extending through a slot 59 of the barrel extension 2 and engaging lugs 60 of the breech block. During the backward movement of the breech block it carries with it the tube 55 and the spring 21 is compressed by this means.

In explanation of the movement of the breech block, reference may be had to Figs. 13 to 15 in which it will be seen that at one side of the tail piece there is an opening 40 provided with a shoulder 41 and a slanting surface 42 at the rear end. The dog 19 has a shoulder 43 acting against the shoulder 41 and further the dog 19 has a rounded surface 44 which can act against the surface 42. The dog 19 extends into a slot 45 at a side of the breech block as shown in Fig. 14 and finally the breech block is provided with a notch 46 situated near to the forward end of the same, the dog being adapted to engage in the side notch also. When the tail piece recoils, the breech block partakes in the said movement. The said movement of the tail piece causes the shoulder 41 to pass the shoulder 43 of the dog. When the tail piece moves forward after the recoil, the shoulder 41 abuts against the shoulder 43 of the dog and the tail piece is locked thereby.

The breech block does not return at the same time as the barrel extension as hereinbefore mentioned but it moves freely farther back on account of its momentum. The dog 19 lying in the slot 45 is thereby finally raised by the surface 47 so that the barrel extension is released. The breech block moves farther backward and thereby the dog 19 engages with a notch 46 so that the breech block is locked. At the next moment the dog 19 is raised out of the notch 46 by the slanting surface 42 of the forwardly moving tail piece whereby the breech block is released and moves forward to the terminal position, the cartridge being thus inserted into the barrel and the next cartridge in the band engaged in the manner described.

At the next discharge operation and recoil movement the empty shell still embraced by the transporter is withdrawn from the barrel. As the new cartridge is moved downward by the lever 13 it finally moves the empty shell downward past the projecting part 11 until the shell, disengaged from the groove $9^x$, is stopped by a short stationary projection or lug 23 on the tail piece. The position of the cartridge is thereby nicely fixed. During the following forward movement of the breech block the empty shell slides from the projection 23 and falls out through the opening 22 while the cartridge remains in the position mentioned before, supported by the part 11. In order that the fore end of the empty shell may be forced downward, bevel lugs 24 are provided on the tail piece which are struck by the advancing shell.

In order that the feeding operation may be effected manually, when necessary, special means are provided arranged as follows. A slide 25, extending along the casing, is provided in one of the side walls of the same and provided with a handle 26. The said slide engages by means of a projection or lug 27 a slide 28 provided on the inner side of the casing, which slide 28 has a slot 29, similar to the slot 17 and engaged by another projection or lug 30 on the lever 13. The slide 25 also engages the firing pin 32 by means of the projection 27. The rear part of the lower edge of the slot 17 consists of a yielding part or lug 31. The slide 25 is moved backward, as a new cartridge is to be inserted manually and an empty shell is to be withdrawn. The slide 28 is thereby moved backward and acts upon the lever 13 by means of the pin 30, the fore end of the lever being thereby swung upward. At the same time the spring of the firing pin is set to act, the breech block is released and pulled backward carrying with it the cartridge shell and withdrawing the cartridge from the band. As the breech block arrives to its rear terminal position, it is engaged by the trigger dog 33. The slide 25 is then moved forward carrying with it the slide 28, while the breech block remains in its position. The fore end of the lever is thereby swung downward forcing the cartridge and the empty shell downward, as stated above. As the trigger 34 and the dog 33 connected with the same are forced backward, the breech block is moved forward and the cartridge inserted in the barrel, the discharging operation being then effected automatically, after the mechanism has been locked.

In order that the lever 13 may move in the desired manner during the manual feeding operation just described, though its lug 16 enters the slot 17 of the fixed breech block, a movable lug 31 is provided at the said slot, yielding for the lever 13.

In the breech block there are two levers 51, 51, Fig. 17, placed one at each side of the firing pin and adapted to turn around pivots 56. The fore ends of the levers form hooks 52, 52, directed outward and adapted to engage holes in the barrel extension 2, as shown in Fig. 3. The hooks 52 cannot move inward, close to each other, because the firing pin lies between them, Fig. 17. Thus the breech block is locked. The rear ends of the levers 51 have projections 53 directed toward the firing pin and placed in grooves in the firing pin. When the firing pin is moved backward, as stated above, the anterior, thicker part of the firing pin extends between the rear ends of the levers whereby the levers are turned so that the hooks 52 are moved against each other and out of engagement with the barrel extension and the breech block is released.

Fig. 10 shows safety means preventing the extractors 10 from leaving hold of the cartridge while withdrawing the same. Stationary lugs 35 are provided in the casing on both sides of the path of the breech block and so situated, that they are at some distance from the extractors 10 rearward, at the instant when the extractors have engaged the cartridge, the said lugs being also located at such a distance from each other that the extractors can pass the same when closed. As the extractors are in front of the lugs, they can be moved so far away from each other, that they can engage the flange of the cartridge. As the breech block is then moved backward, the band will accompany the same owing to a narrow play but strikes its abutment, after the extractors 10 have entered between the lugs 35. The said lugs now prevent the extractors from yielding, while the cartridge is disengaged from the band.

During the automatic firing the dog 33 is swung downward owing to the retracted position of the trigger 34. As the trigger 34 is released, the dog 33 ascends and catches the breech block so that it is stopped in the position shown in Fig. 2. For the removal from the fire arm of the cartridge moved downward, a lever 36 is provided in the cover 7 at the top side of the arm, which lever can be swung manually to the position shown in dotted lines in Fig. 2 pushing the cartridge downward through the opening 22. A spring 37 returns the released lever to the position shown in full lines.

Having thus described my invention, what I claim as new and desire to secure by Letters Patent is:

1. In fire-arms the combination of a reciprocating tail piece provided with a slot, a breech block movable with relation to the tail piece, extractors carried by the breech block, a transporter also on the breech block, said transporter being provided with a slot guiding the cartridge when moved transversely, a lever for effecting the said transversal movement, said lever being provided with a lateral projection engaging the slot in the tail piece, said slot being suitably shaped to impart to the lever the desired movement on the movement of the tail piece.

2. In fire-arms, the combination of a reciprocating tail piece, a transporter fixed to the breech block for guiding the cartridge when moved transversely for placing the cartridge in a line with the barrel, said transporter being provided with a slot in which the flanged end of a cartridge is capable of sliding, two extractors fixed to the breech block and forming the top end of the said slot, the said extractors being adapted to extract the cartridge as the breech block is moved backward and a lever for moving the cartridge transversely, said lever being movable upon operation of the tail piece and being extended with its fore end above the cartridge through the slot in the transporter when the breech block is in its rear terminal position.

3. In fire-arms, the combination of a reciprocating breech block, extractors on the fore end of the same, a transporter also on the fore end of the breech block and firmly connected with the same, said transporter being provided with a slot guiding a cartridge when moved transversely, a lever effecting the said transversal movement and a part fixed to the mechanism casing to which the lever is pivotally connected.

4. In fire-arms, the combination of a reciprocating breech block, a firing pin, a transporter on the fore end of the breech block adapted to guide the cartridge when moved transversely, a slide on the mechanism casing moved manually and engaging the firing pin, a second slide provided with a slot, a lever, and a lateral projection on the lever engaging the slot of the second slide.

5. In a device of the character described, a barrel, a reciprocating tail piece having a slot, a breech block movable with relation to the tail piece and provided with extractors and with a transporter to guide a cartridge into line with the barrel and means extended within the slot of the tail piece operable by movement of such tail piece for imparting the desired movement to the cartridge.

6. In a device of the character described, a barrel, a reciprocating tail piece having a slot, a breech block movable with relation to the tail piece provided with means to guide a cartridge into line with the barrel, and means extending within the slot of the tail piece operated by the movement thereof for moving a cartridge along its guiding means.

7. In a device of the character described, a barrel, a reciprocating tail piece having a slot, a breech block movable with relation to the tail piece provided with means for guiding a cartridge into line with the barrel, and means capable of oscillatory movement extended within the slot and put into operation by movement of the tail piece for forcing the cartridge along the guiding means.

In witness whereof, I have hereunto signed my name in the presence of two subscribing witnesses.

RUDOLF HENRIK KJELLMAN.

Witnesses:
 HJALMAR ZETTERSTRÖM,
 ROBERT APELGREN.